(12) United States Patent
Henry et al.

(10) Patent No.: US 7,707,397 B2
(45) Date of Patent: Apr. 27, 2010

(54) VARIABLE GROUP ASSOCIATIVITY BRANCH TARGET ADDRESS CACHE DELIVERING MULTIPLE TARGET ADDRESSES PER CACHE LINE

(75) Inventors: G. Glenn Henry, Austin, TX (US); Thomas C. McDonald, Austin, TX (US)

(73) Assignee: VIA Technologies, Inc., Taipei (TW)

( * ) Notice: Subject to any disclaimer, the term of this patent is extended or adjusted under 35 U.S.C. 154(b) by 1229 days.

(21) Appl. No.: 11/181,210

(22) Filed: Jul. 14, 2005

(65) Prior Publication Data

US 2005/0268076 A1    Dec. 1, 2005

Related U.S. Application Data

(63) Continuation-in-part of application No. 09/849,736, filed on May 4, 2001, now abandoned, and a continuation-in-part of application No. 10/978,802, filed on Nov. 1, 2004, now abandoned, which is a continuation of application No. 09/849,734, filed on May 4, 2001, now Pat. No. 6,886,093, application No. 11/181,210, which is a continuation-in-part of application No. 10/978,812, filed on Nov. 1, 2004, now Pat. No. 7,398,377, which is a continuation of application No. 09/849,800, filed on May 4, 2001, now Pat. No. 6,895,498, application No. 11/181,210, which is a continuation-in-part of application No. 10/632,226, filed on Jul. 31, 2003, now Pat. No. 7,165,168.

(60) Provisional application No. 60/598,868, filed on Aug. 4, 2004, provisional application No. 60/440,065, filed on Jan. 14, 2003.

(51) Int. Cl.
*G06F 7/48* (2006.01)
*G06F 9/00* (2006.01)
*G06F 9/44* (2006.01)

(52) U.S. Cl. .......... 712/239; 712/238; 711/171
(58) Field of Classification Search .......... 712/238, 712/239; 711/171
See application file for complete search history.

(56) References Cited

U.S. PATENT DOCUMENTS 4,181,942 A    1/1980    Forster et al.

(Continued)

FOREIGN PATENT DOCUMENTS

WO    WO99/32965    7/1999
WO    WO02/08895    1/2002

OTHER PUBLICATIONS

Moinuddin K. Qureshi et al, The V-Way Cache : Demand Based Associativity via Global Replacement, 2004.*

(Continued)

*Primary Examiner*—Alford W Kindred
*Assistant Examiner*—Jesse R Moll
(74) *Attorney, Agent, or Firm*—E. Alan Davis; James W. Huffman

(57) ABSTRACT

A branch prediction apparatus having two two-way set associative cache memories each indexed by a lower portion of an instruction cache fetch address is disclosed. The index selects a group of four entries, one from each way of each cache. Each entry stores a single target address of a different previously executed branch instruction. For some groups, the four entries cache target addresses for one branch instruction in each of four different cache lines, to obtain four-way group associativity; for other groups, the four entries cache target addresses for one branch instruction in each of two different cache lines and two branch instructions in a third different cache line, to effectively obtain three-way group associativity, depending on the distribution of the branch instructions in the program. The apparatus trades off associativity for number of predictable branches per cache line on an index-by-index basis to efficiently use storage space.

74 Claims, 4 Drawing Sheets

U.S. PATENT DOCUMENTS

| | | | |
|---|---|---|---|
| 4,200,927 A | 4/1980 | Hughes et al. | |
| 4,860,197 A | 8/1989 | Langendorf et al. | |
| 5,142,634 A | 8/1992 | Fite et al. | |
| 5,148,538 A * | 9/1992 | Celtruda et al. | 711/205 |
| 5,163,140 A | 11/1992 | Stiles et al. | |
| 5,313,634 A | 5/1994 | Eickemeyer | |
| 5,353,421 A | 10/1994 | Emma et al. | |
| 5,355,459 A | 10/1994 | Matsuo et al. | |
| 5,394,530 A | 2/1995 | Kitta | |
| 5,404,467 A | 4/1995 | Saba et al. | |
| 5,434,985 A | 7/1995 | Emma et al. | |
| 5,513,330 A | 4/1996 | Stiles | |
| 5,530,825 A | 6/1996 | Black et al. | |
| 5,553,246 A | 9/1996 | Suzuki | |
| 5,604,877 A | 2/1997 | Hoyt et al. | |
| 5,623,614 A | 4/1997 | Van Dyke et al. | |
| 5,623,615 A | 4/1997 | Salem et al. | |
| 5,634,103 A | 5/1997 | Dietz et al. | |
| 5,687,349 A | 11/1997 | McGarity | |
| 5,687,360 A | 11/1997 | Chang | |
| 5,706,491 A | 1/1998 | McMahan | |
| 5,721,855 A | 2/1998 | Hinton et al. | |
| 5,732,243 A | 3/1998 | McMahan | |
| 5,734,881 A | 3/1998 | White et al. | |
| 5,752,069 A | 5/1998 | Roberts et al. | |
| 5,761,723 A | 6/1998 | Black et al. | |
| 5,768,576 A | 6/1998 | Hoyt et al. | |
| 5,802,602 A | 9/1998 | Rahman et al. | |
| 5,805,877 A | 9/1998 | Black et al. | |
| 5,812,839 A | 9/1998 | Hoyt et al. | |
| 5,828,901 A | 10/1998 | O'Toole et al. | |
| 5,832,289 A | 11/1998 | Shaw et al. | |
| 5,850,532 A | 12/1998 | Narayan et al. | |
| 5,850,543 A | 12/1998 | Shiell et al. | |
| 5,864,707 A | 1/1999 | Tran et al. | |
| 5,867,701 A | 2/1999 | Brown et al. | |
| 5,881,260 A | 3/1999 | Raje et al. | |
| 5,881,265 A | 3/1999 | McFarland et al. | |
| 5,931,944 A | 8/1999 | Ginosar et al. | |
| 5,948,100 A | 9/1999 | Hsu et al. | |
| 5,961,629 A | 10/1999 | Nguyen et al. | |
| 5,964,868 A | 10/1999 | Gochman et al. | |
| 5,968,169 A | 10/1999 | Pickett | |
| 5,974,543 A | 10/1999 | Hilgendorf et al. | |
| 5,978,909 A | 11/1999 | Lempel | |
| 6,035,391 A | 3/2000 | Isaman | |
| 6,041,405 A | 3/2000 | Green | |
| 6,044,459 A | 3/2000 | Bae et al. | |
| 6,081,884 A | 6/2000 | Miller | |
| 6,085,311 A | 7/2000 | Narayan et al. | |
| 6,088,793 A | 7/2000 | Liu et al. | |
| 6,101,595 A | 8/2000 | Pickett et al. | |
| 6,108,773 A | 8/2000 | Col et al. | |
| 6,122,729 A | 9/2000 | Tran | |
| 6,134,654 A | 10/2000 | Patel et al. | |
| 6,151,671 A | 11/2000 | D'Sa et al. | |
| 6,154,833 A | 11/2000 | Murty et al. | |
| 6,157,988 A | 12/2000 | Dowling | |
| 6,170,054 B1 | 1/2001 | Poplingher | |
| 6,175,897 B1 | 1/2001 | Ryan et al. | |
| 6,185,676 B1 | 2/2001 | Poplingher et al. | |
| 6,233,676 B1 | 5/2001 | Henry et al. | |
| 6,250,821 B1 | 6/2001 | Schwendinger | |
| 6,256,727 B1 | 7/2001 | McDonald | |
| 6,260,138 B1 | 7/2001 | Harris | |
| 6,279,105 B1 | 8/2001 | Konigsburg et al. | |
| 6,279,106 B1 | 8/2001 | Roberts | |
| 6,308,259 B1 | 10/2001 | Witt | |
| 6,314,514 B1 | 11/2001 | McDonald | |
| 6,321,321 B1 | 11/2001 | Johnson | |
| 6,351,796 B1 | 2/2002 | McCormick et al. | |
| 6,374,349 B1 | 4/2002 | McFarling | |
| 6,374,350 B1 | 4/2002 | D'Sa et al. | |
| 6,381,692 B1 | 4/2002 | Martin et al. | |
| 6,418,525 B1 | 7/2002 | Charney et al. | |
| 6,457,120 B1 | 9/2002 | Sinharoy | |
| 6,502,185 B1 | 12/2002 | Keller et al. | |
| 6,560,696 B1 | 5/2003 | Hummel et al. | |
| 6,601,161 B2 | 7/2003 | Rappoport et al. | |
| 6,647,467 B1 | 11/2003 | Dowling | |
| 6,725,357 B1 | 4/2004 | Cousin | |
| 6,748,441 B1 | 6/2004 | Gemmell | |
| 6,754,808 B1 | 6/2004 | Roth et al. | |
| 6,757,815 B2 * | 6/2004 | Kacevas | 712/238 |
| 6,823,444 B1 | 11/2004 | Henry et al. | |
| 6,886,093 B2 | 4/2005 | Henry | |
| 6,895,498 B2 | 5/2005 | McDonald et al. | |
| 6,898,699 B2 | 5/2005 | Jourdan et al. | |
| 6,910,124 B1 | 6/2005 | Sinharoy | |
| 6,968,444 B1 | 11/2005 | Kroesche et al. | |
| 7,024,545 B1 | 4/2006 | Zuraski, Jr. et al. | |
| 2002/0099928 A1 | 7/2002 | Janik et al. | |
| 2002/0188833 A1 | 12/2002 | Henry et al. | |
| 2002/0194460 A1 | 12/2002 | Henry et al. | |
| 2002/0194461 A1 | 12/2002 | Henry et al. | |
| 2002/0194463 A1 | 12/2002 | Henry et al. | |
| 2002/0194464 A1 | 12/2002 | Henry et al. | |
| 2003/0236969 A1 | 12/2003 | Kacevas et al. | |
| 2004/0030866 A1 | 2/2004 | McDonald | |
| 2004/0139281 A1 | 7/2004 | McDonald | |
| 2004/0139292 A1 | 7/2004 | McDonald | |
| 2004/0139301 A1 | 7/2004 | McDonald | |
| 2004/0143709 A1 | 7/2004 | McDonald | |
| 2004/0143727 A1 | 7/2004 | McDonald | |
| 2005/0044343 A1 | 2/2005 | Henry et al. | |
| 2005/0076193 A1 | 4/2005 | Henry et al. | |
| 2005/0114636 A1 | 5/2005 | McDonald et al. | |
| 2005/0132175 A1 | 6/2005 | Henry et al. | |
| 2005/0198479 A1 | 9/2005 | Bean et al. | |
| 2005/0198481 A1 | 9/2005 | Henry et al. | |
| 2006/0218385 A1 * | 9/2006 | Smith et al. | 712/238 |
| 2007/0083741 A1 | 4/2007 | Henry et al. | |

OTHER PUBLICATIONS

Performance/Energy Efficiency of Variable Line-Size Caches for Intelligent Memory Systems: Koji Inoue, Koji Kai and Kazuaki Murakami; 2001.*

Online Computing Dictionary. http://instantweb.com/d/dictionary/foldoc.cgi?query=btb May 5, 1995. Branch Target Buffer.

The D Latch, Play-Hookey Web Page, Oct. 10, 1999.

Patterson et al. "Computer Organization & Design: The Hardware/Software Interface." Morgan Kaufmann Publishers, Inc. San Francisco, CA. 1998 p. 469.

Jimenez et al. "The Impact of Delay on the Design of Branch Predictors." 2000.

Eberly et al. "The Correlation Branch Target Address Cache" May 1996.

Patterson et al. "Computer Organization & Design: The Hardware/Software Interface." Morgan Kaufmann Publishers, Inc. San Francisco, CA. 1998 p. 453-455.

*Microprocessor Report.* vol. 9. No. 2. Feb. 16, 1995. p. 5.

*Microprocessor Report.* Aug. 23, 1999. p. 7.

Yeh et al. *Alternative Implementation of Two-Level Adaptive Branch Prediction.* 19th Annual International Symposium on Computer Architecture. pp. 124-134. May 19-21, 1992. Gold Coast, Australia.

Chang et al. *Alternative Implementations of Hybrid Branch Predictors.* Proceedings of Micro-28. 1995. IEEE.

Mc Farling, Scott. *WRL Technical Note TN-36*. Combining Branch Predictors. Jun. 1993. Western Research Laboratory, 250 University Ave., Palo Alto, CA 94301.

Bray et al. *Strategies for Branch Target Buffers*. Technical Report No. CSL-TR-91-480. Jun. 1991.

Sakamoto et al. *Microarchitecture Support for Reducing Branch Penalty in a Superscaler Processor*. pp. 208-216. Mittsubishi Electric Corp. 4-1 Mizuhara, Itami, Hyogo 664. Japan, 1996. IEEE.

IEEE 100, The Authoritative Dictionary of IEEE Standard Terms, Seventh Edition. The Institute of Electrical Engineering, Inc. New York: Standards Information Network IEEE Press p. 135.

IBM Technical Disclosure Bulletin NN9204269, "Return Address Stack Cache." Apr. 1992, pp. 269-271.

Skadron et al. "Branch Prediction, Instruction-Window Size, and Cache Size: Performance Trade-Offs and Simulation Techniques." IEEE Transactions on Computers. vol. 48. No. 11. Nov. 1999. pp. 1260-1281.

* cited by examiner

US 7,707,397 B2

VARIABLE GROUP ASSOCIATIVITY BRANCH TARGET ADDRESS CACHE DELIVERING MULTIPLE TARGET ADDRESSES PER CACHE LINE

CROSS REFERENCE TO RELATED APPLICATION(S)

This application claims priority based on U.S. Provisional Application Ser. No. 60/598,868, filed Aug. 4, 2004, entitled BRANCH TARGET ADDRESS CACHE WITH IMPROVED EFFICIENCY FOR DELIVERING MULTIPLE TARGET ADDRESSES PER ACCESS.

This application is a continuation-in-part (CIP) of the following Non-Provisional U.S. Patent Applications, which are hereby incorporated by reference in their entirety for all purposes:

| Serial No. (Docket No.) | Filing Date | Title |
|---|---|---|
| 09/849736 (CNTR.2021) | 5/4/2001 | MICROPROCESSOR WITH BRANCH TARGET ADDRESS CACHE FOR PERFORMING SPECULATIVE BRANCHING |
| 10/978802 (CNTR.2023-C1) | 11/1/2004 | SPECULATIVE HYBRID BRANCH DIRECTION PREDICTOR |
| 10/978812 (CNTR.2063-C1) | 11/1/2004 | APPARATUS AND METHOD FOR TARGET ADDRESS REPLACEMENT IN SPECULATIVE BRANCH TARGET ADDRESS CACHE |
| 10/632226 (CNTR.2140) | 7/31/2003 | APPARATUS AND METHOD FOR EFFICIENTLY UPDATING BRANCH TARGET ADDRESS CACHE |

Pending U.S. patent application Ser. No. 10/978,802 is a continuation of U.S. patent application Ser. No. 09/849,734, now U.S. Pat. No. 6,886,093 filed May 4, 2001; Pending U.S. patent application Ser. No. 10/978,812 is a continuation of U.S. patent. application Ser. No. 09/849,800, now U.S. Pat. No. 6,895,498 filed May 4, 2001; U.S. patent application Ser. No. 10/632,226 claims priority of U.S. Provisional Application Ser. No. 60/440,065 filed Jan. 14, 2003.

FIELD OF THE INVENTION

The present invention relates in general to the field of branch prediction in microprocessors, and particularly to branch target address caches.

BACKGROUND OF THE INVENTION

Many modern pipelined microprocessors include a branch target address cache (BTAC) that caches target addresses of previously executed branch instructions. When a cache line is fetched from the microprocessor's instruction cache, the fetch address is provided to the BTAC and the BTAC uses the fetch address to predict whether there is a branch instruction present in the cache line, and whether the BTAC contains a valid target address for the branch instruction. If the branch instruction is predicted taken, the processor branches to the valid target address supplied by the BTAC. Since each cache line can store multiple instructions, the instruction cache line may contain more than one branch instruction. Consequently, some BTACs statically dedicate storage for caching two target addresses per cache line. This allows the BTAC to more accurately predict program flow since it is possible that one of the branch instructions in the cache line will be taken and the other not taken.

In the conventional BTACs, the storage for the two target addresses is fixed in the BTAC. That is, the space is statically dedicated regardless of whether two branch instructions are present in the cache line or one branch instruction is present in the cache line. In fact, in one conventional BTAC which is integrated into the instruction cache, the space is statically dedicated even if zero branch instructions are present in the cache line. However, it has been observed that only approximately 20% of the cache lines that contain a branch instruction contain two branch instructions. Consequently, the extra space in the BTAC statically dedicated for the second target address is wasted for 80% of the cache lines. For example, in a BTAC that is a 2-way set associative cache that statically dedicates storage for two target addresses per entry, since only about 20% of the cache lines include two or more branch instructions, only about 60% of the target address storage space is used to store valid target addresses.

Therefore, what is needed is a more space efficient scheme for predicting multiple branch instructions in a fetched cache line.

BRIEF SUMMARY OF INVENTION

The present invention provides a branch prediction apparatus that dynamically determines the associativity of a group of entries selected by a given fetch address index depending upon the number of branch instructions present in the cache lines specified by the index, thereby enjoying greater associativity for indexes with only a single branch instruction and less associativity for indexes with multiple branch instructions.

In one aspect, the present invention provides an apparatus in a microprocessor for predicting a target address for a variable number of branch instructions in each cache line fetched from an instruction cache at a fetch address. The apparatus includes first and second two-way set associative cache memories, each having an index input coupled to receive a portion of the instruction cache fetch address. The index selects one of a plurality of groups of four entries. Each group has one entry in each way of each of the first and second cache memories. Each of the entries is configured to cache a target address of one previously executed branch instruction. The apparatus also includes replacement logic, coupled to the first and second caches, configured to select for replacement one of the entries, in response to resolution of a branch instruction, such that during operation of the microprocessor: a) for a first subset of the plurality of groups, the four entries are caching target addresses for one branch instruction in each of four different cache lines, to obtain four-way group associativity; and b) for a second subset of the plurality of groups, the four entries are caching target addresses for one branch instruction in each of two different cache lines and two branch instructions in a third different cache line, to obtain three-way group associativity.

In another aspect, the present invention provides a method in a microprocessor for predicting a target address for a variable number of branch instructions in a cache line fetched from an instruction cache at a fetch address. The method includes providing an index to first and second two-way set associative cache memories to select one of a plurality of groups of four entries. Each group includes one entry in each way of each of the first and second cache memories. Each of the entries caches a target address of one previously executed branch instruction. The index is a portion of the instruction cache fetch address. The method also includes selecting for replacement, in response to resolution of a branch instruction, one of the entries such that during operation of the microprocessor: a) for a first subset of the plurality of groups, the four entries are caching target addresses for one branch instruction in each of four different cache lines, to obtain four-way group associativity; and b) for a second subset of the plurality of groups, the four entries are caching target addresses for one branch instruction in each of two different cache lines and two branch instructions in a third different cache line, to obtain three-way group associativity.

In another aspect, the present invention provides an apparatus in a microprocessor for predicting a target address for a variable number of branch instructions in a cache line fetched from an instruction cache at a fetch address. The apparatus includes M N-way set associative cache memories, each having an index input coupled to receive a portion of the instruction cache fetch address. The index selects one of a plurality of groups of M×N entries. Each group includes one entry in each way of each of the M cache memories. Each of the entries is configured to cache a target address of one previously executed branch instruction. The apparatus also includes replacement logic, coupled to the M caches, configured to select for replacement one of the entries, in response to resolution of a branch instruction, such that during operation of the microprocessor: a) for a first subset of the plurality of groups, the M×N entries are caching target addresses for one branch instruction in each of M×N different cache lines, to obtain M×N-way group associativity; and b) for a second subset of the plurality of groups, the M×N entries are caching target addresses for one branch instruction in each of (M×N−1) different cache lines and two branch instructions in a M×Nth different cache line, to effectively obtain (M×N−1)-way group associativity.

In another aspect, the present invention provides a method in a microprocessor for predicting a target address for a variable number of branch instructions in a cache line fetched from an instruction cache at a fetch address. The method includes providing an index to M N-way set associative cache memories to select one of a plurality of groups of M×N entries. Each group includes one entry in each way of each of the M cache memories. Each of the entries caches a target address of one previously executed branch instruction. The index is a portion of the instruction cache fetch address. The method also includes selecting for replacement, in response to resolution of a branch instruction, one of the entries such that during operation of the microprocessor: a) for a first subset of the plurality of groups, the M×N entries are caching target addresses for one branch instruction in each of M×N different cache lines, to obtain M×N-way group associativity; and b) for a second subset of the plurality of groups, the M×N entries are caching target addresses for one branch instruction in each of (M×N−1) different cache lines and two branch instructions in a M×Nth different cache line, to effectively obtain (M×N−1)-way group associativity.

In another aspect, the present invention provides a computer program product for use with a computing device, the computer program product comprising a computer usable medium, having computer readable program code embodied in the medium, for causing an apparatus in a microprocessor for predicting a target address for a variable number of branch instructions in each cache line fetched from an instruction cache at a fetch address. The computer readable program code includes first program code for providing first and second two-way set associative cache memories, each having an index input coupled to receive a portion of the instruction cache fetch address. The index selects one of a plurality of groups of four entries. Each group includes one entry in each way of each of the first and second cache memories. Each of the entries is configured to cache a target address of one previously executed branch instruction. The computer readable program code also includes second program code for providing replacement logic, coupled to the first and second caches, configured to select for replacement one of the entries, in response to resolution of a branch instruction, such that during operation of the microprocessor: a) for a first subset of the plurality of groups, the four entries are caching target addresses for one branch instruction in each of four different cache lines, to obtain four-way group associativity; and b) for a second subset of the plurality of groups, the four entries are caching target addresses for one branch instruction in each of two different cache lines and two branch instructions in a third different cache line, to obtain three-way group associativity.

An advantage of the present invention is that it can predict two target addresses per instruction cache line where appropriate, but can also predict a single target address per cache line with higher associativity for each cache line index where appropriate. The present invention accomplishes this by storing a single target address per entry rather than by storing multiple target addresses per entry, thereby more efficiently using storage space than a conventional BTAC. Also, if the associativity of the instruction cache is increased, the branch target address prediction apparatus of the present invention may be adapted to increase its effective associativity to approximate the associativity of the instruction cache for many indexes without having to proportionately increase the overall size of the branch target address prediction apparatus.

DETAILED DESCRIPTION

Figure 1:
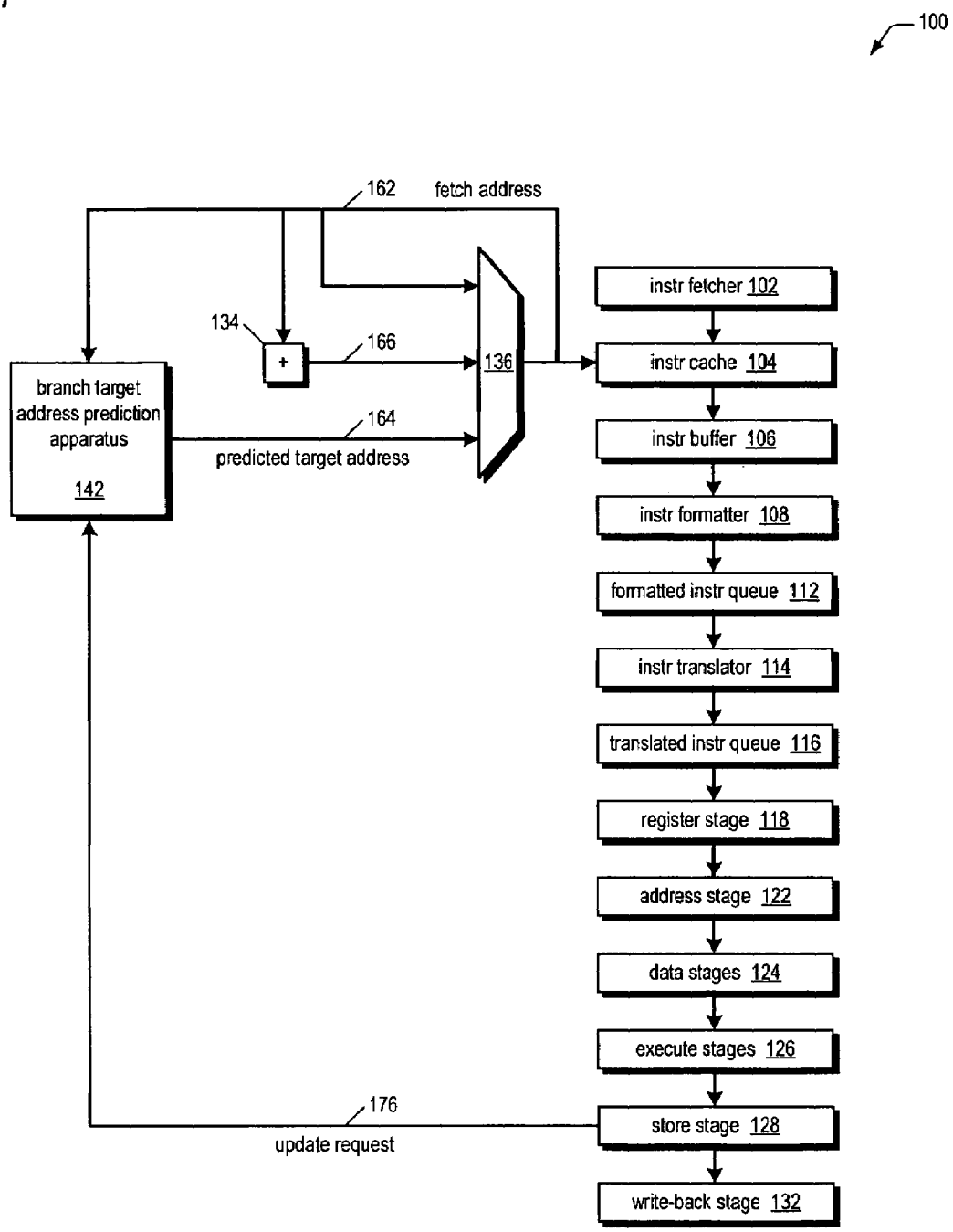
FIG. 1 is a block diagram of a microprocessor according to the present invention.

Referring now to FIG. 1, a block diagram of a microprocessor 100 according to the present invention is shown. The microprocessor 100 comprises a pipelined microprocessor. In one embodiment, the microprocessor 100 comprises a microprocessor whose instruction set conforms substantially to the x86 architecture instruction set.

The microprocessor 100 includes an instruction fetcher 102. The instruction fetcher 102 also controls a fetch address mux 136 that outputs a current instruction cache fetch address 162. The current fetch address 162 specifies the address of the next cache line of instruction bytes of the currently executing program to be fetched for execution by the microprocessor 100. If the fetch address 162 hits in the instruction cache 104, then the instruction cache 104 outputs the cache line of instructions specified by the fetch address 162. Otherwise, the instruction fetcher 102 fetches the missing instructions from a memory, such as a system memory, coupled to the microprocessor 100, and the instruction cache 104 caches the instructions fetched from memory for subsequent use by the microprocessor 100. In particular, the cache line fetched from the instruction cache 104 may include zero, one, two, or more branch instructions. In one embodiment, the instruction cache 104 comprises a 64 KB 4-way set associative level-1 cache; however, the present invention may be configured to be used in conjunction with instruction caches of various sizes and associativities.

The microprocessor 100 also includes a branch target address prediction apparatus 142, discussed in more detail below. The branch target address prediction apparatus 142 caches information about previously executed branch instructions. When the instruction fetcher 102 fetches a cache line from the instruction cache 104, the branch target address prediction apparatus 142 predicts whether one or more branch instructions is present in the cache line based on the information cached in the branch target address prediction apparatus 142 and provides a predicted target address 164 of one of the branch instructions to the mux 136. If the branch instruction is predicted to be taken, the mux 136 selects the predicted target address 164 as the fetch address 162 on the next clock cycle to accomplish a branch of the microprocessor 100 to the predicted target address 164.

Figure 2:
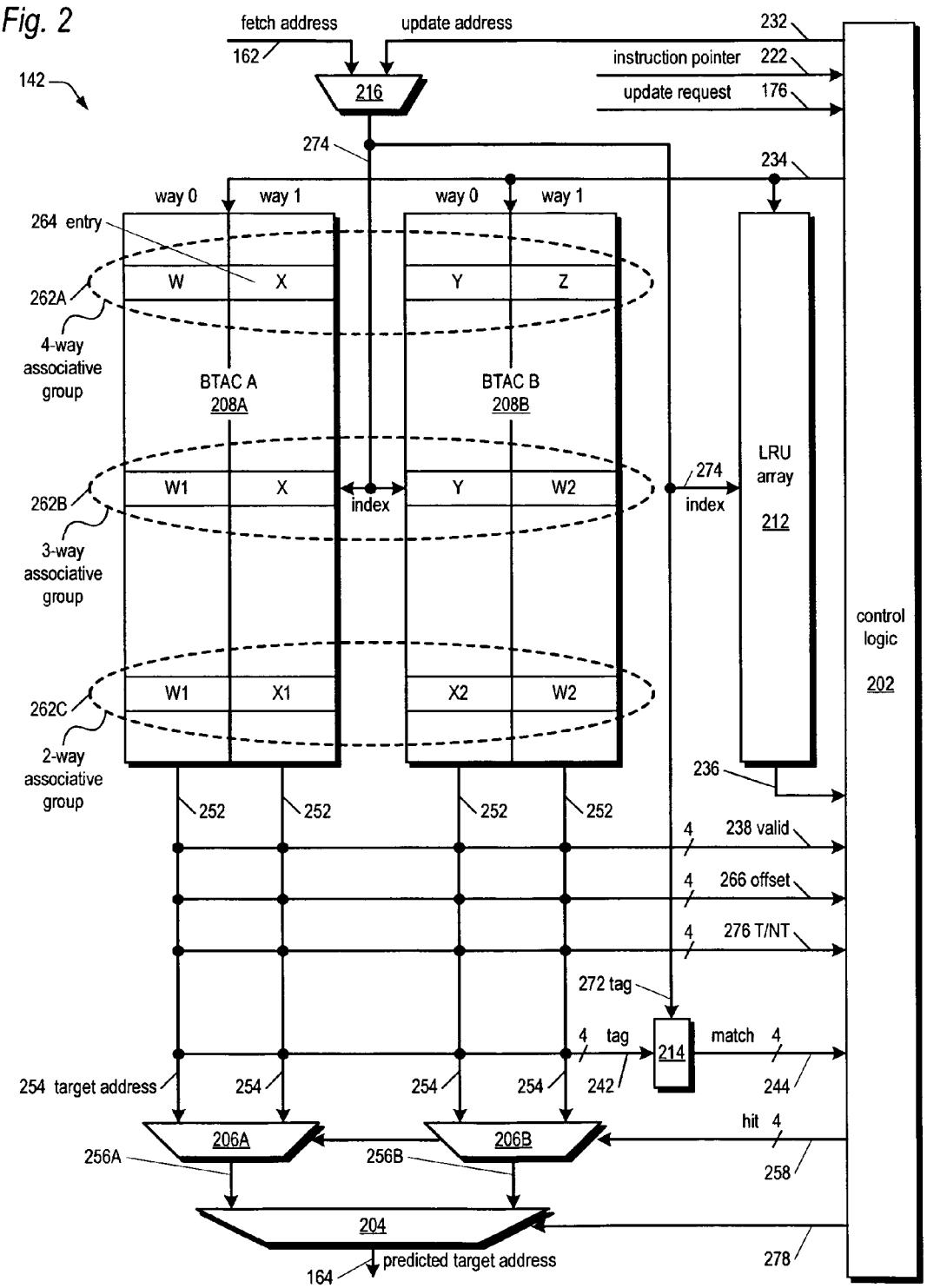
FIG. 2 is a block diagram illustrating the branch target address prediction apparatus of FIG. 1.

In particular, the branch target address prediction apparatus 142 caches the target address of previously executed branch instructions, the offset of the branch instruction within the cache line, a prediction of whether the branch instruction will be taken, a tag of the cache line containing the branch instruction, and a valid indicator. As described in detail below, the branch target address prediction apparatus 142 comprises multiple set-associative branch target address cache memories and replacement logic. The replacement logic controls replacement of the multiple caches as a whole in a manner that dynamically varies the effective associativity for each index group such that for some groups in which multiple branch instructions are present in a corresponding cache line of the instruction cache 104 the associativity is less to accommodate the multiple branches, and for some groups in which only a single branch instruction is present in the corresponding cache line the associativity is greater. An index group, or group, comprises all the entries in all the sets of all the caches selected by the index portion of the fetch address 162, as shown in FIG. 2.

Advantageously, like some conventional branch predictors, the branch target address prediction apparatus 142 can provide multiple target addresses if a cache line fetched from the instruction cache 104 contains multiple branch instructions; however, unlike conventional multi-branch-per-cache-line branch predictors, each entry in the branch target address prediction apparatus 142 of the present invention includes storage for caching only a single branch target address and its related information rather than including storage for caching multiple branch target addresses like the conventional predictors, in whose case the additional storage space is wasted for a substantial percentage of cache lines. Consequently, the branch target address prediction apparatus 142 of the present invention makes more efficient use of storage space and provides greater associativity, thereby potentially improving branch prediction accuracy.

It should be understood that the use of the term cache line, or line, herein, unless otherwise indicated, refers to the quantum of instruction bytes that the instruction fetcher 102 fetches from the instruction cache 104 each clock cycle, which may be a subset of the number of bytes actually transferred between the instruction cache 104 and main memory. For example, in the embodiment of FIG. 1, the microprocessor 100 may transfer 32 bytes of instructions at a time between system memory and the instruction cache 104; however, the instruction fetcher 102 fetches only 16 bytes from the instruction cache 104 each clock cycle. As discussed below, in one embodiment, the branch target address prediction apparatus 142 predicts whether one or more branch instructions is present in a cache line, or 16 byte fetch quantum, each clock cycle.

The microprocessor 100 also includes an instruction buffer 106 coupled to the instruction cache 104. The instruction buffer 106 receives cache lines of instruction bytes from the instruction cache 104 and buffers the cache lines until they can be formatted into distinct instructions to be executed by the microprocessor 100. In one embodiment, the instruction buffer 106 comprises four entries for storing up to four cache lines.

The microprocessor 100 also includes an instruction formatter 108 coupled to the instruction buffer 106. The instruction formatter 108 receives instruction bytes from the instruction buffer 106 and generates formatted instructions therefrom. That is, the instruction formatter 108 views a string of instruction bytes in the instruction buffer 106, determines which of the bytes comprise the next instruction and the length thereof, and outputs the next instruction and its length. In one embodiment, the formatted instructions comprise instructions conforming substantially to the x86 architecture instruction set.

The microprocessor 100 also includes a formatted instruction queue 112 coupled to the instruction formatter 108. The formatted instruction queue 112 receives formatted instructions from the instruction formatter 108 and buffers the formatted instructions until they can be translated into microinstructions. In one embodiment, the formatted instruction queue 112 comprises entries for storing up to twelve formatted instructions.

The microprocessor 100 also includes an instruction translator 114 coupled to formatted the instruction queue 112. The instruction translator 114 translates the formatted macroinstructions stored in the formatted instruction queue 112 into microinstructions. In one embodiment, the microprocessor 100 includes a reduced instruction set computer (RISC) core that executes microinstructions of the reduced, or native, instruction set.

The microprocessor 100 also includes a translated instruction queue 116 coupled to the instruction translator 114. The translated instruction queue 116 receives translated microinstructions from the instruction translator 114 and buffers the microinstructions until they can be executed by the remainder of the microprocessor pipeline.

The microprocessor 100 also includes a register stage 118 coupled to the translated instruction queue 116. The register stage 118 comprises a plurality of registers for storing instruction operands and results. The register stage 118 includes a user-visible register file for storing the user-visible state of the microprocessor 100.

The microprocessor 100 also includes an address stage 122 coupled to the register stage 118. The address stage 122 includes address generation logic for generating memory addresses for instructions that access memory, such as load or store instructions and branch instructions.

The microprocessor 100 also includes data stages 124 coupled to the address stage 122. The data stages 124 include logic for loading data from memory and one or more caches for caching data loaded from memory.

The microprocessor 100 also includes execute stages 126 coupled to the data stage 124. The execute stages 126 include execution units for executing instructions, such as arithmetic and logic units for executing arithmetic and logic instructions. In one embodiment, execution stages 126 include an integer execution unit, a floating point execution unit, an MMX execution unit, and an SSE execution unit. The execute stages 126 also include logic for resolving branch instructions. In particular, the execute stages 126 determine whether a branch instruction is taken and the actual target address of the branch instruction.

The microprocessor 100 also includes a store stage 128 coupled to the execute stages 126. The store stage 128 includes logic for storing data to memory in response to store microinstructions. Additionally, the store stage 128 generates an update request 176 to update the branch target address prediction apparatus 142 with the resolved branch instruction target address and related information in response to the execute stages 126 resolving the branch instruction. The update request 176 includes, among other things, the address of the resolved branch instruction and the resolved target address, each of which are 32 bits in one embodiment. BTAC update request 176 also includes information (discussed in more detail below with respect to FIG. 2) that is piped down with the branch instruction that was obtained when the branch target address prediction apparatus 142 was accessed concurrently with the fetch of the cache line containing the branch instruction from the instruction cache 104.

The microprocessor 100 also includes a write-back stage 132 coupled to the store stage 128. The write-back stage 132 includes logic for writing an instruction result to the register stage 118.

In addition to receiving the predicted target address 164, the mux 136 also receives the fetch address 162 and a next sequential fetch address 166. An adder 134 generates the next sequential fetch address 166 by incrementing the current fetch address 162 by the size of a cache line. After a normal fetch of a cache line from the instruction cache 104, the multiplexer 136 selects the next sequential fetch address 166 to output as the current fetch address 162 on the next clock cycle. If the instruction buffer 106 is full, the mux 136 selects the fetch address 162 rather than the next sequential fetch address 166. As described above, if the branch target address prediction apparatus 142 indicates that it has provided a valid predicted target address 164 for a branch instruction in the cache line currently fetched from the instruction cache 104 and the branch instruction is predicted to be taken, the mux 136 selects the predicted target address 164 as the fetch address 162 on the next clock cycle. Although not shown, the mux 136 also receives a correct address from the store stage 128. If the store stage 128 indicates a branch instruction was mispredicted, then the mux 136 selects the correct address to correct for the branch misprediction.

Referring now to FIG. 2, a block diagram illustrating the branch target address prediction apparatus 142 of FIG. 1 is shown. The branch target address prediction apparatus 142 includes control logic 202 that controls various aspects of the operation of the branch target address prediction apparatus 142, such as the reading and writing of BTACs 208 and an LRU array 212 described below. The control logic 202 receives an instruction pointer 222 of the microprocessor 100 that specifies the address of the program instruction currently being fetched for execution.

The branch target address prediction apparatus 142 also includes a two-input address mux 216. The address mux 216 receives the instruction cache 104 fetch address 162 of FIG. 1 on one input and receives an update address 232 generated by the control logic 202 on the other input. The control logic 202 controls the address mux 216 to output the fetch address 162 when the BTACs 208 and/or LRU array 212 are being read and controls the address mux 216 to select the update address 232 when the BTACs 208 and/or LRU array 212 are being written.

The branch target address prediction apparatus 142 also includes two branch target address cache (BTAC) memories, denoted BTAC A 208A and BTAC B 208B. BTAC A 208A and BTAC B 208B are referred to generically individually as BTAC 208 and collectively as BTACs 208. BTAC A 208A and BTAC B 208B are also referred to herein as side A and side B. Each BTAC 208 is coupled to receive an index portion 274 of the address output by mux 216. In one embodiment, the index 274 comprises bits 4 through 13 of the address output by mux 216. Each BTAC 208 is two-way set associative. Each unique index 274 value selects a different set of two ways (denoted way 0 and way 1 in FIG. 2) from each of the BTACs 208. Each of way 0 and way 1 has an entry 264 configured to cache a target address 254 of a previously executed branch instruction; a valid indicator 238 indicating whether the entry 264 is valid; an offset 266 specifying the location, or starting byte offset, of the previously executed branch instruction within the corresponding cache line fetched from the instruction cache 104; a taken/not taken (T/NT) prediction 276 of whether the previously executed branch instruction will be taken; and a tag 242 of the address of the cache line containing the previously executed branch instruction. The BTACs 208 are separately updatable; hence, the control logic 202 generates separate write signals to each of the BTACs 208.

The four entries 264 selected by an index 274 value (two entries 264 from each of the two BTACs 208) are collectively referred to herein as an index group 262, or group 262, as shown in FIG. 2. FIG. 2 illustrates three representative groups 262, denoted 262A, 262B, and 262C. In one embodiment, the branch target address prediction apparatus 142 has 1024 groups 262. Each time the instruction fetcher 102 fetches a cache line from the instruction cache 104, the BTACs 208 output the information 252 cached in all four entries 264 of the group 262 selected by the index 274 of the fetch address 162.

Group 262A exemplifies a subset of groups 262 in the branch target address prediction apparatus 142 that are caching a branch target address and related information for a single previously executed branch instruction in each of four different instruction cache lines. The four different target addresses are denoted W, X, Y, Z in group 262A. That is, the cached tag of each of the four different cache lines is unique. Thus, although each of the two BTACs 208 is only two-way set associative, viewing the two BTACs 208 collectively, group 262A is effectively a four-way associative group 262 since for the same index 274 value it caches a target address for a single branch instruction in four different cache lines.

Group 262B exemplifies a subset of groups 262 in the branch target address prediction apparatus 142 that are caching a branch target address and related information for a single previously executed branch instruction in each of two different instruction cache lines and for two previously executed branch instructions in a third different instruction cache line. The four different target addresses are denoted W1, X, Y, W2 in group 262B. W1 and W2 denote target addresses for two different branch instructions in the same cache line. That is, the cached tag associated with target addresses W1 and W2 is identical, but is unique from the cached tag associated with target addresses X and Y. Thus, viewing the two BTACs 208 collectively, group 262B is effectively a three-way associative group 262 since for the same index 274 value it caches a target address for a single branch instruction in two different instruction cache lines and caches two target addresses for two different branch instructions in a third different instruction cache line.

Group 262C exemplifies a subset of groups 262 in the branch target address prediction apparatus 142 that are caching a branch target address and related information for two different previously executed branch instructions in each of two different instruction cache lines. The four different target addresses are denoted W1, X1, X2, W2 in group 262C. W1 and W2 denote target addresses for two different branch instructions in a first instruction cache line and X1 and X2 denote target addresses for two different branch instructions in a second instruction cache line. That is, the cached tags associated with target addresses W1 and W2 are identical, the cached tags associated with target addresses X1 and X2 are identical, and cached tags associated with target addresses W1 and W2 are unique from the cached tags associated with target addresses X1 and X2. Thus, viewing the two BTACs 208 collectively, group 262C is effectively a two-way associative group 262 since for the same index 274 value it caches a target address for two different branch instructions in each of two different cache lines.

Whether a given index group 262 in the branch target address prediction apparatus 142 falls into the subset of 2-way, 3-way, or 4-way associative groups 262 depends upon the distribution of previously executed branch instructions within the currently executing programs, and in particular, upon the distribution of the previously executed branch instructions within the cache lines storing the instructions of the currently executing programs. Advantageously, when the microprocessor 100 executes and finally resolves a new branch instruction and updates the branch target address prediction apparatus 142 with the new branch instruction's target address and associated information, the branch target address prediction apparatus 142 may replace an existing entry 264 in the selected group 262 to vary the associativity of the group 262 as necessary. In particular, the branch target address prediction apparatus 142 may reduce the level of associativity to accommodate a distribution of branch instructions for a given index 274 that has two branch instructions in a cache line or even two branch instructions in two cache lines; conversely, the branch target address prediction apparatus 142 may increase the level of associativity to accommodate a distribution of branch instructions for a given index 274 that has only a single branch instruction in each cache line.

The branch target address prediction apparatus 142 also includes a least recently used (LRU) memory array 212. The LRU array 212 also receives the index 274, which selects an entry in the LRU array 212. Each entry in the LRU array 212 stores replacement information for a corresponding one of the groups 262 in the BTACs 208 selected by the index 274. Thus, the LRU array 212 is a global resource shared between the two BTACs 208. In one embodiment, the replacement information includes a bit for indicating whether BTAC A 208A or BTAC B 208B was least recently used with respect to the selected group 262; a bit for indicating whether way 0 or way 1 of BTAC A 208A was least recently used with respect to the set in BTAC A 208A selected by the index 274; and a bit for indicating whether way 0 or way 1 of BTAC B 208B was least recently used with respect to the set in BTAC B 208B selected by the index 274. Each time the instruction fetcher 102 fetches a cache line from the instruction cache 104, the LRU array 212 outputs the replacement information 236 of the entry selected by the index 274. The control logic 202 generates update data 234 provided as input to the BTACs 208 and LRU array 212. The control logic 202 causes the address select mux 216 to select the update address 232 when updating the BTACs 208 and/or LRU array 212 with the update data 234. In one embodiment, the update data 234 may include updated LRU information, target addresses, tags, valid bits, branch instruction offsets, and T/NT predictions. The control logic 202 uses the replacement information 236 to determine which entry 264 in a group 262 to replace when a branch instruction is resolved and the pipeline generates an update request 176, as described below in more detail, particularly with respect to FIG. 4. The control logic 202 also updates the replacement information in the LRU array 212 based on use of the information stored in the BTACs 208. In one embodiment, an entry 264 in the BTACs 208 is considered used for least recently used purposes if it is allocated for replacement and also if its associated branch instruction is valid, seen, and predicted taken when the BTACs 208 are read.

The branch target address prediction apparatus 142 also includes four comparators 214 which aid in detecting whether the fetch address 162 hits in the BTACs 208. Each of the comparators 214 receives a tag 242 output by the BTACs 208 from a respective one of the entries 264 of the group 262 selected by the index 274 portion of the fetch address 162 output by mux 216 as address 274. Each of the comparators 214 compares its respective tag 242 with the tag portion 272 of the fetch address 162 and generates a true value on a respective match indicator 244 if the respective tag 242 matches the fetch address 162 tag 272. The match indicators 244 are provided to the control logic 202.

The control logic 202 also receives a valid indicator 238, branch instruction offset 266, and T/NT prediction 276 output by the BTACs 208 from a respective one of the entries 264 of the group 262 selected by the index 274. The control logic 202 generates four hit indicators 258 corresponding to the four entries 264 of the group 262. The control logic 202 generates a true value on a hit indicator 258 if both the corresponding valid indicator 238 and match signal 244 are true. The hit indicators 258 are piped down the microprocessor 100 pipeline along with the branch instruction for use in deciding which entry 264 in a group 262 to replace when the branch instruction is resolved.

The branch target address prediction apparatus 142 also includes a two-input way-select mux A 206A and a two-input way-select mux B 206B. Way-select mux A 206A receives the target address 254 from each of the entries 264 of BTAC A 208A in the group 262 selected by the index 274. The control logic 202, via hit signals 258, causes way-select mux A 206A to select for output as side target address 256A the target address 254 of way 0 or way 1 in which the fetch address 162 hit. Similarly, way-select mux B 206B receives the target address 254 from each of the entries 264 of BTAC B 208B in the group 262 selected by the index 274, and the control logic 202 causes way-select mux B 206B to select for output as side target address 256B the target address 254 of way 0 or way 1 in which the fetch address 162 hit.

The branch target address prediction apparatus 142 also includes a two-input side-select mux 204 that receives side target address 256A and side target address 256B from the way select muxes 206. The control logic 202, via a select signal 278, causes the side select mux 204 to output as the predicted target address 164 of FIG. 1 the target address 256 of the first, valid, taken, seen branch instruction in the selected group 262, as described in more detail below with respect to FIG. 3.

The control logic 202 receives the update request 176 of FIG. 1. The update request 176 includes information about the resolved branch instruction, such as its address and target address. The update request 176 also includes the valid bits 238, offsets 266, T/NT predictions 276, match indicators 244, and LRU information 236 output when the branch target address prediction apparatus 142 was accessed when the branch instruction was initially fetched from the instruction cache 104 and that were piped down through the microprocessor 100 pipeline along with the branch instruction. The update request 176 also includes an indication of which of the two BTACs 208 and which of the two ways within that BTAC 208 provided the prediction information for the resolved branch instruction if the resolved branch instruction is not a new branch instruction, i.e., if the branch target prediction apparatus 142 was already caching prediction information for the resolved branch instruction.

In one embodiment, each of the BTACs 208 comprises separate memory arrays for caching the branch prediction information. For example, in one embodiment, the branch target addresses 254 and branch instruction offsets 266 are cached in a first memory array, the tags 242 and valid bits 238 are cached in a second memory array, and the T/NT predictions 276 are stored in a third memory array. In one embodiment, the storage elements of the separate T/NT storage arrays are two-bit saturating up/down counters for indicating a strongly taken, taken, not taken, or strongly not taken prediction. In another embodiment, the T/NT predictions 276 are made by a completely separate branch predictor other than the BTACs 208, such as a branch history table.

As may be observed from FIG. 2 and the other Figures, the branch target address prediction apparatus 142 of the present invention makes more efficient use of storage space than conventional multi-branch-per-cache-line branch predictors by including storage for caching only a single branch target address and its related information per entry rather than statically including storage for caching multiple branch target addresses per entry. However, the storage space efficiency is obtained at the expense of caching tags for each BTAC 208, which in the embodiment of FIG. 2 is twice as many tags as a single conventional multi-branch-per-cache-line BTAC. However, the tags are substantially fewer bits than the branch target address and related prediction information (in one embodiment, 20 bits of tag are cached per entry, whereas 42 bits of branch prediction information are cached per entry); therefore, advantageously the overall size of the branch target prediction apparatus 142 is smaller. Furthermore, the branch target prediction apparatus 142 advantageously provides variable associativity per group, which potentially improves its performance over a conventional BTAC.

Figure 3:
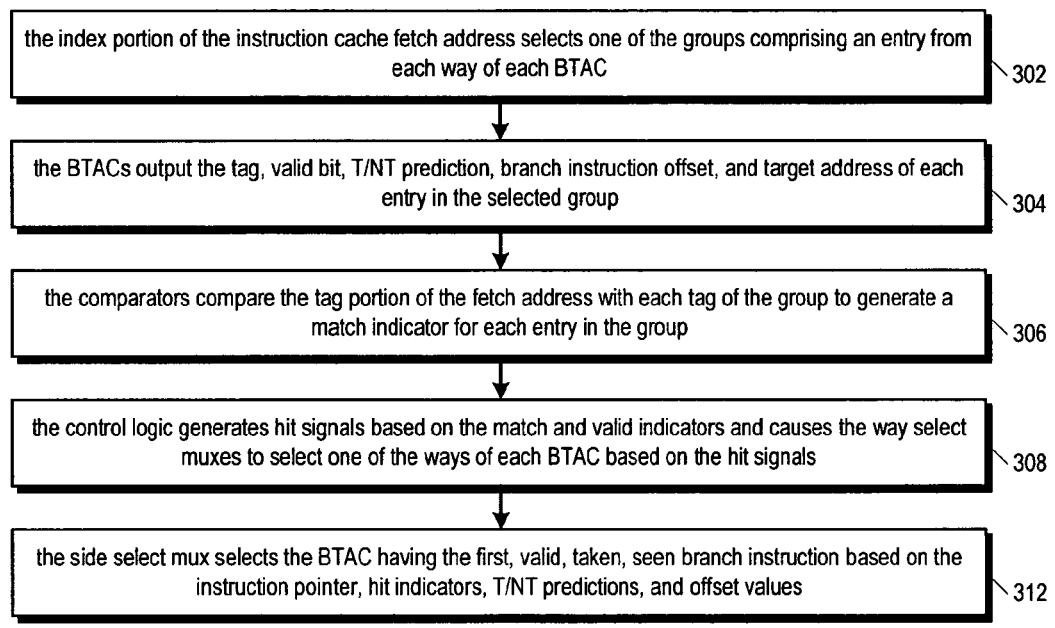
FIG. 3 is a flowchart illustrating operation of the branch target address prediction apparatus of FIG. 2 when being read to generate a predicted target address.

Referring now to FIG. 3, a flowchart illustrating operation of the branch target address prediction apparatus 142 of FIG. 2 when being read to generate a predicted target address 164 is shown. Flow begins at block 302.

At block 302, the instruction fetcher 102 generates the fetch address 162 to fetch a cache line of instructions from the instruction cache 104 of FIG. 1. The fetch address 162 is also provided to access the branch target address prediction apparatus 142 of FIG. 1. In response to the fetch address 162, the control logic 202 controls the address mux 216 to select the fetch address 162 for output as address 274 of FIG. 2. The index 274 portion of the fetch address 162 selects one of the groups 262 of the BTACs 208 of FIG. 2. As described above, the group 262 comprises an entry 264 of each way 0 and 1 of each BTAC A 208A and BTAC B 208B. Flow proceeds to block 304.

At block 304, the BTACs 208 output the tag 242, valid bit 238, offset 266, T/NT prediction 276, and target address 254 of FIG. 2 of each entry of the group 262 selected at block 302. Flow proceeds to block 306.

At block 306, the comparators 214 compare the fetch address 162 tag 272 with each tag 242 of the selected group 262 to generate the match indicators 244 of FIG. 2 for each entry 264 in the group 262. Flow proceeds to block 308.

At block 308, the control logic 202 generates the hit indicators 258 for each entry 264 of the selected group 262, based on their corresponding match indicators 244 and valid indicators 238. The control logic 202 also controls the way select muxes 206 to select the target address 254 of the way in which the fetch address 162 hit, as indicated by the hit indicators 258. Flow proceeds to block 312.

At block 312, the side select mux 204 selects the BTAC 208 having the first, valid, taken, seen branch instruction based on the instruction pointer 222, hit indicators 258, T/NT predictions 276, and offset 266 values. The control logic 202 determines from the T/NT predictions 276 whether a branch instruction is taken. In one embodiment, the branch instruction is taken if its T/NT prediction 276 is taken or strongly taken. A branch instruction is seen if its offset 266 value is greater than or equal to the value of the corresponding least significant bits of the current instruction pointer 222. A branch instruction is valid if its corresponding valid bit 238 is true. A branch instruction is first in its cache line if it is earliest in the cache line, i.e., if it has the lower offset 266 value. Thus, if the fetch address 162 hits in both BTAC A 208A and BTAC B 208B (i.e., if the branch target address prediction apparatus 142 contains a valid target address for each of two branch instructions in the currently fetched cache line), and both branch instructions are predicted taken, and the offset 266 of both the branch instructions is greater than the instruction pointer 222 (i.e., both branches are seen), then the control logic 202 causes the side select mux 204 to select the target address 256 of the branch instruction with the lowest offset 266 value. If the fetch address 162 hits in only one of BTAC A 208A and BTAC B 208B (i.e., if the branch target address prediction apparatus 142 contains a valid target address for only one branch instruction in the currently fetched cache line), or only one branch instruction is predicted taken, or the offset 266 of only one of the branch instructions is less than the instruction pointer 222, then the control logic 202 causes the side select mux 204 to select the target address 256 of the valid, taken, seen branch instruction. Flow ends at block 312.

Figure 4:
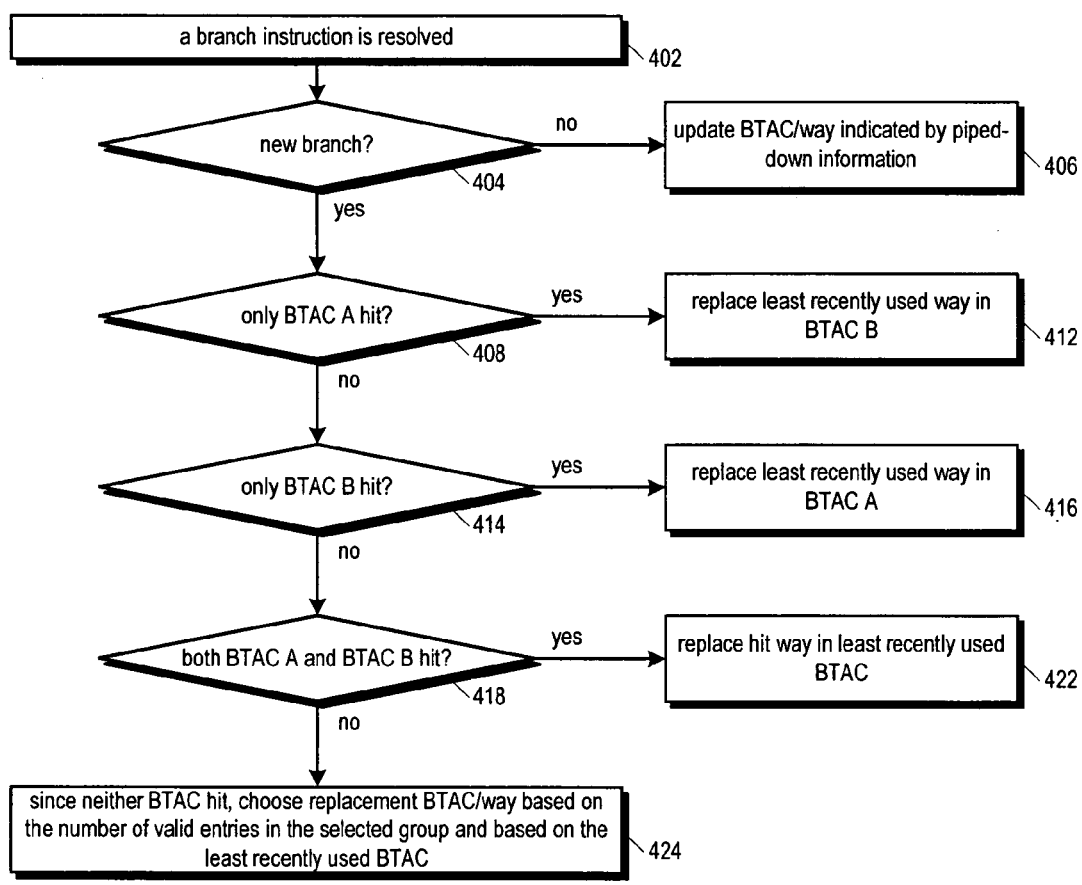
FIG. 4 is a flowchart illustrating operation of the branch target address prediction apparatus of FIG. 2 when being updated in response to a resolved branch instruction.

Referring now to FIG. 4, a flowchart illustrating operation of the branch target address prediction apparatus 142 of FIG. 1 when being updated in response to a resolved branch instruction is shown. Flow begins at block 402.

At block 402, the microprocessor 100 pipeline resolves a branch instruction and responsively generates an update request 176 of FIG. 1, which includes the address of the resolved branch instruction, the resolved target address of the branch instruction, and the piped-down information generated when the branch target address prediction apparatus 142 potentially generated a predicted target address 164 for the branch instruction. Flow proceeds to decision block 404.

At decision block 404, the control logic 202 examines the piped-down information in the update request 176 to determine whether the resolved branch instruction is a new branch instruction, i.e., whether neither of the BTACs 208 is already caching valid prediction information for the resolved branch instruction. If the resolved branch instruction is new, flow proceeds to decision block 408; otherwise, flow proceeds to block 406.

At block 406, the control logic 202 updates the way in BTAC A 208A or BTAC B 208B which is already caching valid prediction information for the resolved branch instruction, as indicated by the piped-down information in the update request 176. For example, if the piped-down information indicates that way 1 of BTAC B 208B is caching prediction information for the resolved branch instruction, then the control logic 202 updates the entry in way 1 of BTAC B 208B of the group 262 selected by the index 274 of the branch instruction address in the update request 176 that is provided as update address 232 to mux 216 during the update of the branch target prediction apparatus 142. Flow ends at block 406.

At decision block 408, the control logic 202 examines the piped-down information in the update request 176 to determine whether the fetch address portion of the resolved branch instruction hit only in BTAC A 208A. That is, the control logic 202 determines whether the branch target prediction apparatus 142 is predicting that BTAC A 208A but not BTAC B 208B is caching valid prediction information for a branch instruction in the cache line containing the resolved branch instruction, but which is not the resolved branch instruction. If not, flow proceeds to decision block 414; otherwise, flow proceeds to block 412.

At block 412, the control logic 202 replaces the least recently used way in BTAC B 208B of the group 262 selected by the index 274 of the branch instruction address in the update request 176, which is provided as update address 232 to mux 216. That is, the control logic 202 examines the LRU information 236 for the selected group 262 to determine whether way 0 or way 1 was least recently used and replaces that way in BTAC B 208B with the prediction information of the resolved branch instruction. Thus advantageously, the selected group 262 will be caching branch prediction information for two branch instructions in the same cache line, making it either a 2-way associative or 3-way associative group 262, depending upon the contents of the other two entries 264 in the group 262. Flow ends at block 412.

At decision block 414, the control logic 202 examines the piped-down information in the update request 176 to determine whether the fetch address portion of the resolved branch instruction hit only in BTAC B 208B. That is, the control logic 202 determines whether the branch target prediction apparatus 142 is predicting that BTAC B 208B but not BTAC A 208A is caching valid prediction information for a branch instruction in the cache line containing the resolved branch instruction, but which is not the resolved branch instruction. If not, flow proceeds to decision block 418; otherwise, flow proceeds to block 416.

At block 416, the control logic 202 replaces the least recently used way in BTAC A 208A of the group 262 selected by the index 274 of the branch instruction address in the update request 176, which is provided as update address 232 to mux 216. That is, the control logic 202 examines the LRU information 236 for the selected group 262 to determine whether way 0 or way 1 was least recently used and replaces that way in BTAC A 208A with the prediction information of the resolved branch instruction. Thus advantageously, the selected group 262 will be caching branch prediction information for two branch instructions in the same cache line, making it either a 2-way associative or 3-way associative group 262, depending upon the contents of the other two entries 264 in the group 262. Flow ends at block 416.

At decision block 418, the control logic 202 examines the piped-down information in the update request 176 to determine whether the fetch address portion of the resolved branch instruction hit in both BTAC A 208A and BTAC B 208B. That is, the control logic 202 determines whether the branch target prediction apparatus 142 is predicting that BTAC B 208B and BTAC A 208A are each caching valid prediction information for a different branch instruction in the cache line containing the resolved branch instruction, but which is not the resolved branch instruction. If not, flow proceeds to block 424; otherwise, flow proceeds to block 422.

At block 422, the control logic 202 replaces the hit way in the least recently used BTAC 208 of the group 262 selected by the index 274 of the branch instruction address in the update request 176, which is provided as update address 232 to mux 216. That is, the control logic 202 examines the LRU information 236 for the selected group 262 to determine whether BTAC A 208A or BTAC B 208B was least recently used within the selected group 262; then the control logic 202 examines the piped-down information in the update request 176 to determine whether way 0 or way 1 hit in the least recently used BTAC 208, and replaces that way in the least recently used BTAC 208 with the prediction information of the resolved branch instruction. Thus advantageously, the selected group 262 will still be caching branch prediction information for two branch instructions in the same cache line, making it either a 2-way associative or 3-way associative group 262, depending upon the contents of the other two entries 264 in the group 262. Flow ends at block 422.

At block 424, neither BTAC 208 hit, i.e., the piped-down information in the update request 176 indicates the fetch address portion of the resolved branch instruction hit in neither BTAC A 208A nor BTAC B 208B. That is, neither BTAC B 208B nor BTAC A 208A are caching valid prediction information for a branch instruction in the cache line containing the resolved branch instruction. Consequently, the control logic 202 chooses a BTAC 208 and way to replace based on the number of valid entries in the selected group 262 and based on the least recently used BTAC 208. In particular, the control logic 202 chooses the least recently used BTAC 208 of the group 262, unless both ways of one BTAC 208 are valid and not both ways of the other BTAC 208 are valid, in which case the control logic 202 replaces the other BTAC 208, as described in the code below. Flow ends at block 424.

The code below describes the replacement method used by the control logic 202, which is summarized in the flowchart of FIG. 4.

```
//
// Btac update logic
//
// Define some signals needed below
wire [1:0] xbpBtacRdHitA_W, xbpBtacRdHitB_W;
rregs #(2) rhaw (xbpBtacRdHitA_W, xbpBtacRdHitA_S, clk);
rregs #(2) rhbw (xbpBtacRdHitB_W, xbpBtacRdHitB_S, clk);
wire xcfBtacAHit_W = | xbpBtacRdHitA_W;
wire xcfBtacBHit_W = | xbpBtacRdHitB_W;
wire xcfBtacHitAB_W = xcfBtacAHit_W & xcfBtacBHit_W;
wire [1:0] xbpBtacRdValA_W, xbpBtacRdValB_W;
rregs #(2) rvaw (xbpBtacRdValA_W, xbpBtacRdValA_S, clk);
rregs #(2) rvbw (xbpBtacRdValB_W, xbpBtacRdValB_S, clk);
wire xcfBtacAFull_W = & xbpBtacRdValA_W;
wire xcfBtacBFull_W = & xbpBtacRdValB_W;
```

```
// Definition of what the 3 bits in the lru mean:
// lru data
// bit 2 - side A mru
// bit 1 - A way 1 mru
// bit 0 - B way 1 mru
//                      For this 16B
// New Branch   HitA    HitB    Method
//      0        —       —      Use staged way/side
//      1        0       0      Use 3b mru
//      1        0       1      Use 1b A mru
//      1        1       0      Use 1b B mru
//      1        1       1      Use 1b side mru to choose side, then replace way that hit
// For case of new branch, no hits for this 16B. To choose side A vs. B:
//
//                  Valids
//              Side A  Side B  Method
//                2       2     A/B mru
//                2       1     Choose B
//                1       2     Choose A
//                2       0     Choose B
//                0       2     Choose A
//                1       1     A/B mru
//                1       0     A/B mru
//                0       1     A/B mru
//                0       0     A/B mru
//
// The mru bit is used for the last four cases for proper behavior for case of 2 branches
// in the same 16B seen close together. The btac valid bits staged down for the second
// branch may not include the write of the first branch. Using the A/B mru bit allows
// for each branch to be correctly placed on opposite btac sides.
//
// Note that if, for instance, side A is marked as having both ways valid, while side B
// has no ways valid, then if the mru bit indicates B was mru, one of 3 cases has
// occurred:
// 1)       2 branches in the same 16B were seen close together. The first branch was written
//          to side B, so the second branch should be written to side A, even though it will
//          displace another branch.
// 2)       A branch on side B was mru, but it has since been invalidated due to aliasing or
//          self-modifying code.
// 3)       2 branches with the same index, not in the same 16B, were seen close together. The
//          first branch was written to side B, but the second branch should be also written to
//          side B, to avoid displacing another branch.
// Case 1 should be more common than case 2, but not more common that case 3. So
// should choose the side that is not already full.
// lru read addr from E, lru write addr 3 cycles later
// E - read address to lru
// S - lru read, capture in xcfetch
// W - use lru data to determine replacement way, capture new lru write data
// Z - write lru
wire [2:0] xcfBtacLruRdData_W;
rregs_io #(3) lrurd (xcfBtacLruRdData_W, btacLruRdData_P, clk);
wire xcfBtacSideAMRU_W  = xcfBtacLruRdData_W[2];
wire xcfBtacAWay1MRU_W  = xcfBtacLruRdData_W[1];
wire xcfBtacBWay1MRU_W  = xcfBtacLruRdData_W[0];
// if this 16B has no hits in either A or B, use normal lru
wire xcfBtacAReplaceWay0_W =    (xcfBtacAWay1MRU_W & xbpBtacRdValA_W[1]) |
                                 ~xbpBtacRdValA_W[0];
wire xcfBtacBReplaceWay0_W =    (xcfBtacBWay1MRU_W & xbpBtacRdValB_W[1]) |
                                 ~xbpBtacRdValB_W[0];
// Choose side to write based on mru bit and valids
wire xcfBtacLruSelSideA_W =    (~xcfBtacAFull_W & xcfBtacBFull_W) |
                                (~xcfBtacSideAMRU_W & ~ (xcfBtacAFull_W & ~xcfBtacBFull_W));
wire xcfBtacBaseReplace0_W = xcfBtacLruSelSideA_W ?       xcfBtacAReplaceWay0_W :
                                                          xcfBtacBReplaceWay0_W;
// if this 16B already has a hit in either A or B, must write to opposite side
wire xcfBtacForceSideA_W = ~xcfBtacAHit_W &  xcfBtacBHit_W;
wire xcfBtacForceSideB_W =  xcfBtacAHit_W & ~xcfBtacBHit_W;
// if this 16B already has a hit in both A and B, must replace one
wire xcfBtacReplaceHitSideA_W =  xcfBtacHitAB_W & ~xcfBtacSideAMRU_W;
wire xcfBtacReplaceHitSideB_W =  xcfBtacHitAB_W &  xcfBtacSideAMRU_W;
wire xcfBtacUseBaseReplace_W = ~xcfBtacAHit_W & ~xcfBtacBHit_W;
wire xcfBtacReplaceWay0_W =        (xcfBtacForceSideA_W          & xcfBtacAReplaceWay0_W    ) |
                                   (xcfBtacForceSideB_W          & xcfBtacBReplaceWay0_W    ) |
                                   (xcfBtacReplaceHitSideA_W     & xbpBtacRdHitA_W[0]       ) |
                                   (xcfBtacReplaceHitSideB_W     & xbpBtacRdHitB_W[0]       ) |
                                   (xcfBtacUseBaseReplace_W      & xcfBtacBaseReplace0_W    );
wire [1:0] xcfBtacReplaceWay_W = {~xcfBtacReplaceWay0_W, xcfBtacReplaceWay0_W};
wire xcfBtacReplaceA_W =    xcfBtacForceSideA_W | xcfBtacReplaceHitSideA_W |
                            (~xcfBtacForceSideB_W & ~xcfBtacHitAB_W & xcfBtacLruSelSideA_W);
```

-continued

```
//
// Determine if this branch is already in the btac.
// if so, rewrite using the staged way and side, not the lru-chosen victim:
// Choose replacement side only for real new branches. Must qualify WrNew with
// ~(Valid and MatchAB), which indicates we are actually re-writing an existing
// branch due to cache miss, bad target, etc. xbpBtacSelA__W handles these cases.
wire xcfBtacValidMatch__W = xbpBtacValid__W & xbpBtacMatch__W;
wire xcfBtacWrNewReal__W = xcfBtacWrNew__W & ~xcfBtacValidMatch__W;
// Choose replacement side for new branch
wire xcfBtacWrQA__W =    xcfBtacWrNewReal__W ?    xcfBtacReplaceA__W :
                                                  xbpBtacSelA__W;
// If btac was valid for the 16B containing the ins, replace same way, else use
// lru-chosen victim.
wire [1:0] xcfBtacStagedWay__W = xbpBtacSelA__W ?       xbpBtacRdHitA__W :
                                                        xbpBtacRdHitB__W;
wire [1:0] xcfBtacWrQWay__W = xcfBtacWrNewReal__W ?     xcfBtacReplaceWay__W :
                                                        xcfBtacStagedWay__W;
// lru write
// lru update on both allocate and use
// write the lru if the branch was seen and predicted taken
// or when initializing
wire xcfBtacLruWrEn__W = xcfBranchT__W | xcfInitBtac__P;
rregs lrup (xcfBtacLruWrEn__P, xcfBtacLruWrEn__W, clk);
// lru data
// bit 2 - side B mru
// bit 1 - A way 1 mru
// bit 0 - B way 1 mru
wire [2:0] xcfBtacLruWrData__W;
assign xcfBtacLruWrData__W[2] =  ~xcfBtacWrQA__W;
assign xcfBtacLruWrData__W[1] =  ( xcfBtacWrQA__W & ~xcfBtacReplaceWay0__W) |
                                 (~xcfBtacWrQA__W & btacLruRdData__P[1]);
assign xcfBtacLruWrData__W[0] =  (~xcfBtacWrQA__W & ~xcfBtacReplaceWay0__W) |
                                 ( xcfBtacWrQA__W & btacLruRdData__P[0]);
// force 000 when initializing
rregs #(3) lrudp (xcfBtacLruWrData__P, xcfBtacLruWrData__W & {3(~xcfInitBtac__P)}, clk);
```

Although the present invention and its objects, features, and advantages have been described in detail, other embodiments are encompassed by the invention. For example, although an embodiment has been described in which the branch prediction apparatus has two sides and each side is two-way set associative, other embodiments are contemplated. For example, one embodiment is contemplated in which the apparatus has four sides and each side is a direct-mapped cache. An advantage of this embodiment is that it enables some groups to predict target addresses for three branch instructions in the same cache line and for one branch instruction in a different cache line to effectively obtain two-way associativity of the group, and enables some groups to predict target addresses for four branch instructions in the same cache line to effectively obtain one-way associativity of the group. This embodiment may be useful for relatively large cache line fetches. However, a disadvantage of this embodiment is that it requires more time for the control logic to select the first, valid, taken, seen branch instruction of three or four branch instructions in the cache line than to select the first, valid, taken, seen branch instruction of two branch instructions. The additional time might require either a reduction in processor clock frequency or additional pipeline stages. The additional time cost associated with this embodiment must be weighed against the benefit based upon the probability that three or four branch instructions will be contained in the same cache line, which may increase with cache line size increases.

Furthermore, although embodiments have been described in which the number of entries in a group is four, other embodiments are contemplated in which each group contains other numbers of entries. For example, an embodiment in contemplated in which the apparatus has two sides and each side is a direct-mapped cache such that each group contains two entries. For another example, an embodiment in contemplated in which the apparatus has two sides and each side is a four-way set associative cache such that each group contains eight entries. For another example, an embodiment in contemplated in which the apparatus has four sides and each side is a two-way set associative cache such that each group contains eight entries. More generally, embodiments are contemplated in which the apparatus has N sides and each side is an M-way set associative cache such that each group contains M×N entries. Thus some groups may effectively obtain (M×N)-way associativity and predict a target address for only a single branch instruction in M×N different cache lines; other groups may effectively obtain (M×N−1)-way associativity and predict a target address for only a single branch instruction in M×N−1 different cache lines and predict a target address for two branch instructions in a second different cache line; other groups may effectively obtain (M×N−2)-way associativity and predict a target address for only a single branch instruction in M×N−2 different cache lines and predict a target address for two branch instructions in a second different cache line and predict a target address for two branch instructions in a third different cache line; and so forth until finally other groups that may effectively obtain N-way associativity and predict a target address for M branch instructions in each of N different cache lines.

Furthermore, various combinations of numbers of branch instructions per cache line may be achieved within a given group associativity level. For example, assume an apparatus with four sides and each side is a two-way set associative cache. A group may effectively obtain 4-way associativity by predicting for: (1) four branches in a first cache line, two branches in a second cache line, and one branch in third and fourth cache lines; (2) three branches in a first cache line, two branches in a second and third cache lines, and one branch in a fourth cache line; (3) three branches in a first cache line, three branches in a second cache line, and one branch in third and fourth cache lines; or (4) two branches in each of four different cache lines.

While various embodiments of the present invention have been described above, it should be understood that they have been presented by way of example, and not limitation. It will be apparent to persons skilled in the relevant computer arts that various changes in form and detail can be made therein without departing from the spirit and scope of the invention.

For example, in addition to using hardware (e.g., within or coupled to a Central Processing Unit ("CPU"), microprocessor, microcontroller, digital signal processor, processor core, System on Chip ("SOC"), or any other programmable device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), GDSII databases, hardware description languages (HDL) including Verilog HDL, VHDL, and so on, or other available programs, databases, and/or circuit (i.e., schematic) capture tools. Such software can be disposed in any known computer usable medium including semiconductor, magnetic disk, optical disc (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

We claim:

1. An apparatus in a microprocessor for predicting a target address for a variable number of branch instructions in each cache line fetched from an instruction cache at a fetch address, the apparatus comprising:
   first and second two-way set associative cache memories, each having an index input coupled to receive a portion of the instruction cache fetch address, wherein said index selects one of a plurality of groups of four entries, each said group comprising one entry in each way of each of said first and second cache memories, wherein each of said entries is configured to cache a target address of one previously executed branch instruction; and
   replacement logic, coupled to said first and second caches, configured to select for replacement one of said entries, in response to resolution of a branch instruction, such that during operation of the microprocessor:
   a) for a first subset of said plurality of groups, said four entries are caching target addresses for one branch instruction in each of four different cache lines of the instruction cache, to obtain four-way group associativity; and
   b) for a second subset of said plurality of groups, said four entries are caching target addresses for one branch instruction in each of two different cache lines of the instruction cache and two branch instructions in a third different cache line of the instruction cache, to obtain three-way group associativity, wherein the three-way group associativity is obtained even though the two branch instructions in the third different cache line are located without restriction within the third different cache line.

2. The apparatus as recited in claim 1, wherein for said second subset of said plurality of groups, if the instruction cache fetch address hits in both of said first and second cache memories, said first and second caches are configured to provide said target addresses of said two branch instructions in said third cache line.

3. The apparatus as recited in claim 2, further comprising:
   a side select mux, coupled to said first and second cache memories, configured to select one of said target addresses of said two branch instructions in said third cache line based on a location of each of said two branch instructions within said third cache line relative to an instruction pointer of the microprocessor.

4. The apparatus as recited in claim 3, wherein said side select mux is configured to select one of said target addresses of a first valid, taken, seen one of said two branch instructions relative to said instruction pointer.

5. The apparatus as recited in claim 4, wherein each of said two branch instructions is seen if it is located within said third cache line at or after said instruction pointer.

6. The apparatus as recited in claim 4, wherein each of said two branch instructions is valid if its corresponding said entry indicates its corresponding said target address is valid.

7. The apparatus as recited in claim 4, wherein each of said two branch instructions is taken if the microprocessor makes a prediction of whether said branch instruction will be taken that indicates said branch instruction will be taken rather than not taken.

8. The apparatus as recited in claim 7, wherein each of said entries is further configured to cache said prediction.

9. The apparatus as recited in claim 8, wherein each of said first and second cache memories comprises separate storage arrays for caching said target addresses and said predictions.

10. The apparatus as recited in claim 4, wherein one of said two branch instructions is first if its location within said third cache line is before the other of said two branch instructions.

11. The apparatus as recited in claim 3, wherein each of said entries is further configured to cache said location of said branch instruction within said cache line.

12. The apparatus as recited in claim 3, further comprising:
   first and second way select muxes, coupled between said side select mux and said first and second cache memories, respectively, configured to select said target address of one of said ways of said first and second cache memories, respectively, based on which of said ways the instruction cache fetch address hits, and to provide said selected two target addresses to said side select mux.

13. The apparatus as recited in claim 1, wherein each of said entries is further configured to cache a tag of a cache line containing said branch instruction.

14. The apparatus as recited in claim 13, wherein said replacement logic is further configured to select for replacement one of said entries, in response to resolution of a branch instruction, such that for each group in said second subset of said plurality of groups, each of said first and second cache memories caches said tag of said third different cache line containing said two branch instructions.

15. The apparatus as recited in claim 13, wherein the instruction cache fetch address hits in one of said entries of said first and second cache memories if said entry's tag of said cache line containing said branch instruction is valid and matches a tag portion of the fetch address.

16. The apparatus as recited in claim 13, wherein each of said first and second cache memories comprises separate storage arrays for caching said target addresses and said tags.

17. The apparatus as recited in claim 1, wherein in said second subset of said plurality of groups, said two entries caching said target addresses of said two branch instructions in said third different cache line are in different ones of said first and second cache memories.

18. The apparatus as recited in claim 1, further comprising:
a replacement memory, coupled to said replacement logic, configured to store replacement information associated with each of said plurality of groups for use by said replacement logic to select for replacement one of said entries, in response to resolution of said branch instruction.

19. The apparatus as recited in claim 18, wherein if said resolved branch instruction does not have its target address already cached in said first and second cache memories, and if the fetch address of said resolved branch instruction hits only in one of said first and second cache memories, said replacement logic is configured to select for replacement one of said ways of the other of said first and second cache memories.

20. The apparatus as recited in claim 19, wherein said replacement information comprises, for each of said two sets of each said group, an indication of which of said two ways of the set was least recently used, wherein said replacement logic is configured to select for replacement said least recently used way.

21. The apparatus as recited in claim 18, wherein said replacement information comprises an indication of which of said first and second cache memories was least recently used, wherein if said resolved branch instruction does not have its target address already cached in said first and second cache memories, and if the fetch address of said resolved branch instruction hits in both of said first and second cache memories, said replacement logic is configured to select for replacement said least recently used one of said first and second cache memories.

22. The apparatus as recited in claim 18, wherein said replacement information comprises an indication of which of said first and second cache memories was least recently used, wherein if said resolved branch instruction does not have its target address already cached in said first and second cache memories, and if the fetch address of said resolved branch instruction hits in neither of said first and second cache memories, said replacement logic is configured to select for replacement said least recently used one of said first and second cache memories.

23. The apparatus as recited in claim 22, wherein if said resolved branch instruction does not have its target address already cached in said first and second cache memories, and if the fetch address of said resolved branch instruction hits in neither of said first and second cache memories, said replacement logic is configured to select for replacement said least recently used one of said first and second cache memories; however,
if both of said ways of one of said first and second cache memories is valid and less than both of said ways of the other one of said first and second cache memories is valid, then said replacement logic is configured to select for replacement said other one of said first and second cache memories.

24. The apparatus as recited in claim 1, wherein said replacement logic is further configured to select for replacement one of said entries, in response to resolution of a branch instruction, such that during operation of the microprocessor:
c) for a third subset of said plurality of groups, said four entries are caching target addresses of two branch instructions in each of two different cache lines, to obtain two-way group associativity.

25. The apparatus as recited in claim 24, wherein in said third subset of said plurality of groups, said two entries caching said target addresses of said two branch instructions in each of said two different cache lines are in different ones of said first and second cache memories.

26. The apparatus as recited in claim 24, wherein for said third subset of said plurality of groups, if the instruction cache fetch address hits in both of said first and second cache memories, said first and second caches are configured to provide said target addresses of said two branch instructions in one of said two different cache lines.

27. The apparatus as recited in claim 24, wherein each of said entries is further configured to cache a tag of a cache line containing said branch instruction, wherein said replacement logic is further configured to select for replacement one of said entries, in response to resolution of a branch instruction, such that for each group in said third subset of said plurality of groups, each of said first and second cache memories caches said tag of each of said two different cache lines containing said two branch instructions.

28. The apparatus as recited in claim 1, wherein said replacement logic is configured to select for replacement said one of said entries further based on information provided by said first and second two-way set associative cache memories during access thereof temporally concurrent with fetching of the cache line containing said resolved branch instruction from the instruction cache.

29. The apparatus as recited in claim 1, wherein a computer program product comprising a computer usable medium having computer readable program code causes the apparatus, wherein said computer program product is for use with a computing device.

30. A method in a microprocessor for predicting a target address for a variable number of branch instructions in a cache line fetched from an instruction cache at a fetch address, the method comprising:
providing an index to first and second two-way set associative cache memories to select one of a plurality of groups of four entries, each group comprising one entry in each way of each of the first and second cache memories, each of the entries caching a target address of one previously executed branch instruction, the index being a portion of the instruction cache fetch address; and
selecting for replacement, in response to resolution of a branch instruction, one of the entries such that during operation of the microprocessor:
a) for a first subset of the plurality of groups, the four entries are caching target addresses for one branch instruction in each of four different cache lines of the instruction cache, to obtain four-way group associativity; and
b) for a second subset of the plurality of groups, the four entries are caching target addresses for one branch instruction in each of two different cache lines of the instruction cache and two branch instructions in a third different cache line of the instruction cache, to obtain three-way group associativity, wherein the three-way group associativity is obtained even though the two branch instructions in the third different cache line are located without restriction within the third different cache line.

31. The method as recited in claim 30, further comprising:
for the second subset of the plurality of groups, determining whether the instruction cache fetch address hits in both of the first and second cache memories; and
providing by each of the first and second cache memories the target addresses of the two branch instructions in the third cache line.

32. The method as recited in claim 31, further comprising:
selecting one of the target addresses of the two branch instructions in the third cache line based on a location of each of the two branch instructions within the third cache line relative to an instruction pointer of the microprocessor.

33. The method as recited in claim 32, wherein said selecting one of the target addresses comprises selecting one of the target addresses of a first valid, taken, seen one of the two branch instructions relative to the instruction pointer.

34. The method as recited in claim 32, further comprising:
caching the location of the branch instruction within the cache line, prior to said selecting.

35. The method as recited in claim 32, further comprising:
selecting the target address of one of the ways of the first and second cache memories, respectively, based on which of the ways the instruction cache fetch address hits; and
providing the selected two target addresses for said selecting one of the target addresses.

36. The method as recited in claim 30, further comprising:
caching a tag of a cache line containing the branch instruction.

37. The method as recited in claim 30, further comprising:
storing replacement information associated with each of the plurality of groups for use in said selecting for replacement one of the entries, in response to resolution of the branch instruction.

38. The method as recited in claim 37, wherein if the resolved branch instruction does not have its target address already cached in the first and second cache memories, and if the fetch address of the resolved branch instruction hits only in one of the first and second cache memories, said selecting for replacement comprises selecting for replacement one of the ways of the other of the first and second cache memories.

39. The method as recited in claim 38, wherein the replacement information comprises, for each of the two sets of each group, an indication of which of the two ways of the set was least recently used, wherein said selecting for replacement comprises selecting for replacement the least recently used way.

40. The method as recited in claim 37, wherein the replacement information comprises an indication of which of the first and second cache memories was least recently used, wherein if the resolved branch instruction does not have its target address already cached in the first and second cache memories, and if the fetch address of the resolved branch instruction hits in both of the first and second cache memories, said selecting for replacement comprises selecting for replacement the least recently used one of the first and second cache memories.

41. The method as recited in claim 37, wherein the replacement information comprises an indication of which of the first and second cache memories was least recently used, wherein if the resolved branch instruction does not have its target address already cached in the first and second cache memories, and if the fetch address of the resolved branch instruction hits in neither of the first and second cache memories, said selecting for replacement comprises selecting for replacement the least recently used one of the first and second cache memories.

42. The method as recited in claim 41, wherein if the resolved branch instruction does not have its target address already cached in the first and second cache memories, and if the fetch address of the resolved branch instruction hits in neither of the first and second cache memories, said selecting for replacement comprises selecting for replacement the least recently used one of the first and second cache memories; however,
if both of the ways of one of the first and second cache memories is valid and less than both of the ways of the other one of the first and second cache memories is valid, then said selecting for replacement comprises selecting for replacement the other one of the first and second cache memories.

43. The method as recited in claim 30, wherein said selecting for replacement comprises selecting for replacement, in response to resolution of a branch instruction, one of the entries such that during operation of the microprocessor:
c) for a third subset of the plurality of groups, the four entries are caching target addresses of two branch instructions in each of two different cache lines, to obtain two-way group associativity.

44. The method as recited in claim 43, further comprising:
for the third subset of the plurality of groups, determining whether the instruction cache fetch address hits in both of the first and second cache memories; and
providing by each of the first and second caches the target addresses of the two branch instructions in one of the two different cache lines.

45. An apparatus in a microprocessor for predicting a target address for a variable number of branch instructions in a cache line fetched from an instruction cache at a fetch address, the apparatus comprising:
M N-way set associative cache memories, each having an index input coupled to receive a portion of the instruction cache fetch address, wherein said index selects one of a plurality of groups of M×N entries, each said group comprising one entry in each way of each of said M cache memories, wherein each of said entries is configured to cache a target address of one previously executed branch instruction; and
replacement logic, coupled to said M caches, configured to select for replacement one of said entries, in response to resolution of a branch instruction, such that during operation of the microprocessor:
a) for a first subset of said plurality of groups, said M×N entries are caching target addresses for one branch instruction in each of M×N different cache lines of the instruction cache, to obtain M×N-way group associativity; and
b) for a second subset of said plurality of groups, said M×N entries are caching target addresses for one branch instruction in each of (M×N−1) different cache lines of the instruction cache and two branch instructions in a M×Nth different cache line of the instruction cache, to effectively obtain (M×N−1)-way group associativity, wherein the (M×N−1)-way group associativity is obtained even though the two branch instructions in the M×Nth different cache line are located without restriction within the M×Nth different cache line.

46. The apparatus as recited in claim 45, wherein for said second subset of said plurality of groups, if the instruction cache fetch address hits in two of said M cache memories, said M caches are configured to provide said target addresses of said two branch instructions in said M×Nth cache line.

47. The apparatus as recited in claim 46, further comprising:
a side select mux, coupled to said M cache memories, configured to select one of said target addresses of said two branch instructions in said third cache line based on a location of each of said two branch instructions within said M×Nth cache line relative to an instruction pointer of the microprocessor.

48. The apparatus as recited in claim 47, wherein said side select mux is configured to select one of said target addresses of a first valid, taken, seen one of said two branch instructions relative to said instruction pointer.

49. The apparatus as recited in claim 47, further comprising:
N way select muxes, coupled between said side select mux and said M cache memories, respectively, configured to select said target address of one of said ways of said N cache memories, respectively, based on which of said ways the instruction cache fetch address hits, and to provide said selected N target addresses to said side select mux.

50. The apparatus as recited in claim 45, further comprising:
a replacement memory, coupled to said replacement logic, configured to store replacement information associated with each of said plurality of groups for use by said replacement logic to select for replacement one of said entries, in response to resolution of said branch instruction.

51. The apparatus as recited in claim 50, wherein if said resolved branch instruction does not have its target address already cached in said M cache memories, and if the fetch address of said resolved branch instruction misses in at least one of said M cache memories, said replacement logic is configured to select for replacement one of said ways of said at least one of said M cache memories.

52. The apparatus as recited in claim 51, wherein said replacement information comprises, for each of said M sets of each said group, an indication of which of said N ways of the set was least recently used, wherein said replacement logic is configured to select for replacement said least recently used way.

53. The apparatus as recited in claim 50, wherein said replacement information comprises an indication of which of said M cache memories was least recently used, wherein if said resolved branch instruction does not have its target address already cached in said M cache memories, and if the fetch address of said resolved branch instruction hits in all of said M cache memories, said replacement logic is configured to select for replacement said least recently used one of said M cache memories.

54. The apparatus as recited in claim 50, wherein said replacement information comprises an indication of which of said M cache memories was least recently used, wherein if said resolved branch instruction does not have its target address already cached in said M cache memories, and if the fetch address of said resolved branch instruction hits in none of said M cache memories, said replacement logic is configured to select for replacement said least recently used one of said M cache memories.

55. The apparatus as recited in claim 54, wherein if said resolved branch instruction does not have its target address already cached in said M cache memories, and if the fetch address of said resolved branch instruction hits in none of said M memories, said replacement logic is configured to select for replacement said least recently used one of said M cache memories; however,
if all of said ways of one or more of said M cache memories is valid and less than all of said ways of the other ones of said M cache memories is valid, then said replacement logic is configured to select for replacement one of said other ones of said M cache memories.

56. The apparatus as recited in claim 45, wherein said replacement logic is further configured to select for replacement one of said entries, in response to resolution of a branch instruction, such that during operation of the microprocessor:
c) for a third subset of said plurality groups, said M×N entries are caching target addresses of one branch instruction in each of (M×N-2) different cache lines and two branch instructions in each of two different cache lines, to obtain (M×N-2)-way group associativity.

57. The apparatus as recited in claim 45, wherein said replacement logic is further configured to select for replacement one of said entries, in response to resolution of a branch instruction, such that during operation of the microprocessor:
c) for a third subset of said plurality groups, said M×N entries are caching target addresses of M branch instructions in each of N different cache lines, to obtain N-way group associativity.

58. The apparatus as recited in claim 45, wherein a computer program product comprising a computer usable medium having computer readable program code causes the apparatus, wherein said computer program product is for use with a computing device.

59. A method in a microprocessor for predicting a target address for a variable number of branch instructions in a cache line fetched from an instruction cache at a fetch address, the method comprising:
providing an index to M N-way set associative cache memories to select one of a plurality of groups of M×N entries, each group comprising one entry in each way of each of the M cache memories, each of the entries caching a target address of one previously executed branch instruction, the index being a portion of the instruction cache fetch address; and
selecting for replacement, in response to resolution of a branch instruction, one of the entries such that during operation of the microprocessor:
a) for a first subset of the plurality of groups, the M×N entries are caching target addresses for one branch instruction in each of M×N different cache lines of the instruction cache, to obtain M×N-way group associativity; and
b) for a second subset of the plurality of groups, the M×N entries are caching target addresses for one branch instruction in each of (M×N-1) different cache lines of the instruction cache and two branch instructions in a M×Nth different cache line of the instruction cache, to effectively obtain (M×N-1)-way group associativity, wherein the (M×N-1)-way group associativity is obtained even though the two branch instructions in the M×Nth different cache line are located without restriction within the M×Nth different cache line.

60. The method as recited in claim 59, further comprising:
for the second subset of the plurality of groups, determining whether the instruction cache fetch address hits in two of the M cache memories; and
providing by each of the two of the M cache memories the target addresses of the two branch instructions in the M×Nth cache line.

61. The method as recited in claim 60, further comprising:
selecting one of the target addresses of the two branch instructions in the M×Nth cache line based on a location of each of the two branch instructions within the M×Nth cache line relative to an instruction pointer of the microprocessor.

62. The method as recited in claim 61, wherein said selecting one of the target addresses comprises selecting one of the target addresses of a first valid, taken, seen one of the two branch instructions relative to the instruction pointer.

63. The method as recited in claim 59, further comprising:
storing replacement information associated with each of the plurality of groups for use in said selecting for replacement one of the entries, in response to resolution of the branch instruction.

64. The method as recited in claim 63, wherein if the resolved branch instruction does not have its target address already cached in the M cache memories, and if the fetch address of the resolved branch instruction misses in at least one of the M cache memories, said selecting for replacement comprises selecting for replacement one of the ways of the at least one of the M cache memories.

65. The method as recited in claim 64, wherein the replacement information comprises, for each of the M sets of each group, an indication of which of the N ways of the set was least recently used, wherein said selecting for replacement comprises selecting for replacement the least recently used way.

66. The method as recited in claim 63, wherein the replacement information comprises an indication of which of the M cache memories was least recently used, wherein if the resolved branch instruction does not have its target address already cached in the M cache memories, and if the fetch address of the resolved branch instruction hits in all of the M cache memories, said selecting for replacement comprises selecting for replacement the least recently used one of the M cache memories.

67. The method as recited in claim 63, wherein the replacement information comprises an indication of which of the M cache memories was least recently used, wherein if the resolved branch instruction does not have its target address already cached in the M cache memories, and if the fetch address of the resolved branch instruction hits in none of the M cache memories, said selecting for replacement comprises selecting for replacement the least recently used one of the M cache memories.

68. The method as recited in claim 67, wherein if the resolved branch instruction does not have its target address already cached in the M cache memories, and if the fetch address of the resolved branch instruction hits in none of the M cache memories, said selecting for replacement comprises selecting for replacement the least recently used one of the M cache memories; however,
if all of the ways of one or more of the M cache memories is valid and less than all of the ways of the other ones of the M cache memories is valid, then said selecting for replacement comprises selecting for replacement one of the said other ones of the M cache memories.

69. The method as recited in claim 59, wherein said selecting for replacement comprises selecting for replacement, in response to resolution of a branch instruction, one of the entries such that during operation of the microprocessor:
c) for a third subset of said plurality groups, said M×N entries are caching target addresses of one branch instruction in each of (M×N-2) different cache lines and two branch instructions in each of two different cache lines, to obtain (M×N-2)-way group associativity.

70. The method as recited in claim 69, further comprising:
for the third subset of the plurality of groups, determining whether the instruction cache fetch address hits in two of the M cache memories; and
providing by each of the two of the M cache memories the target addresses of the two branch instructions in one of the two different cache lines.

71. The method as recited in claim 59, wherein said selecting for replacement comprises selecting for replacement, in response to resolution of a branch instruction, one of the entries such that during operation of the microprocessor:
c) for a third subset of said plurality groups, said M×N entries are caching target addresses of M branch instructions in each of N different cache lines, to obtain N-way group associativity.

72. The method as recited in claim 71, further comprising:
for the third subset of the plurality of groups, determining whether the instruction cache fetch address hits in all of the M cache memories; and
providing by each of the M cache memories the target addresses of the N branch instructions in one of the N different cache lines.

73. A computer program product for use with a computing device, the computer program product comprising:
a computer usable medium, having computer readable program code embodied in said medium, for causing an apparatus in a microprocessor for predicting a target address for a variable number of branch instructions in each cache line fetched from an instruction cache at a fetch address, said computer readable program code comprising:
first program code for providing first and second two-way set associative cache memories, each having an index input coupled to receive a portion of the instruction cache fetch address, wherein said index selects one of a plurality of groups of four entries, each said group comprising one entry in each way of each of said first and second cache memories, wherein each of said entries is configured to cache a target address of one previously executed branch instruction; and
second program code for providing replacement logic, coupled to said first and second caches, configured to select for replacement one of said entries, in response to resolution of a branch instruction, such that during operation of the microprocessor:
a) for a first subset of said plurality of groups, said four entries are caching target addresses for one branch instruction in each of four different cache lines of the instruction cache, to obtain four-way group associativity; and
b) for a second subset of said plurality of groups, said four entries are caching target addresses for one branch instruction in each of two different cache lines of the instruction cache and two branch instructions in a third different cache line of the instruction cache, to obtain three-way group associativity, wherein the three-way group associativity is obtained even though the two branch instructions in the third different cache line are located without restriction within the third different cache line.

74. The computer program product of claim 73, wherein said computer readable program code further comprises:
fourth program code for providing said replacement logic, wherein said replacement logic is further configured to select for replacement one of said entries, in response to resolution of a branch instruction, such that during operation of the microprocessor:

c) for a third subset of said plurality of groups, said four entries are caching target addresses of two branch instructions in each of two different cache lines, to obtain two-way group associativity.

* * * * *